Oct. 3, 1933.     P. R. MAIN     1,929,074

ICE CREAM STORAGE CABINET

Filed March 14, 1932

Inventor.
Percy R. Main.
by L. Harriman
Atty.

Patented Oct. 3, 1933

1,929,074

UNITED STATES PATENT OFFICE 1,929,074

ICE CREAM STORAGE CABINET

Percy Ray Main, Haverhill, Mass.

Application March 14, 1932. Serial No. 598,676

3 Claims. (Cl. 62—95)

This invention relates to cabinets of the type which are usually employed for the storage of ice cream in large containers where it is sold at retail and must therefore be readily accessible for serving purposes, such cabinets usually comprising a chamber in which the container is located, said chamber having a removable cover and having its side walls surrounded by a refrigerating means.
Prior to my invention it has been customary to absorb the heat in the storage chamber at the sides, only, thereof, and where mechanical refrigeration has been employed, a space for the brine, or liquid having a low freezing point, has been provided entirely about the side walls of the storage chamber, and the expansion coils have been extended about said side walls, in said brine space.

This arrangement has been found to be unsatisfactory for the reason that the resulting temperature in the storage chamber was not sufficiently uniform and was much higher in the upper than in the lower portions thereof, so that the ice cream in the top portion of the container was likely to be too soft, while that in the lower portion thereof was likely to be too hard. As the ice cream in the top portion of the container is necessarily served first, a considerable portion of the contents was likely to be served in an insufficiently frozen condition.

The primary object of my invention is to provide a ice cream cabinet of the character above referred to which shall be so constructed that the upper portions of the storage chamber for the ice cream containers will be maintained at as low, or even a lower temperature than the lower portion thereof, so that the contents of the containers will be kept in a more nearly uniformly frozen condition than has been possible with the cabinets which have been previously employed.

Also to provide a construction of storage chamber which will enable the storage of two containers for each top opening in the cabinet, instead of one, without increasing the length of the cabinet.

I accomplish these objects by providing a cabinet having a container storage chamber which is not only surrounded at its sides by a brine receiving jacket, but is also constructed to provide a brine receiving space between the top of the storage chamber and the top of the cabinet which is in open communication with the space at its sides and in which a series of refrigerant expansion coils are arranged in a manner to provide an effective heat exchange. Also by providing a form of storage chamber which is so constructed with relation to the top openings thereto that two containers may be placed in the chamber in position to be accessible for serving through each opening.

For a more complete disclosure of the invention reference is now made to the following specification, in connection with the accompanying drawing, in which.

Figure 1:
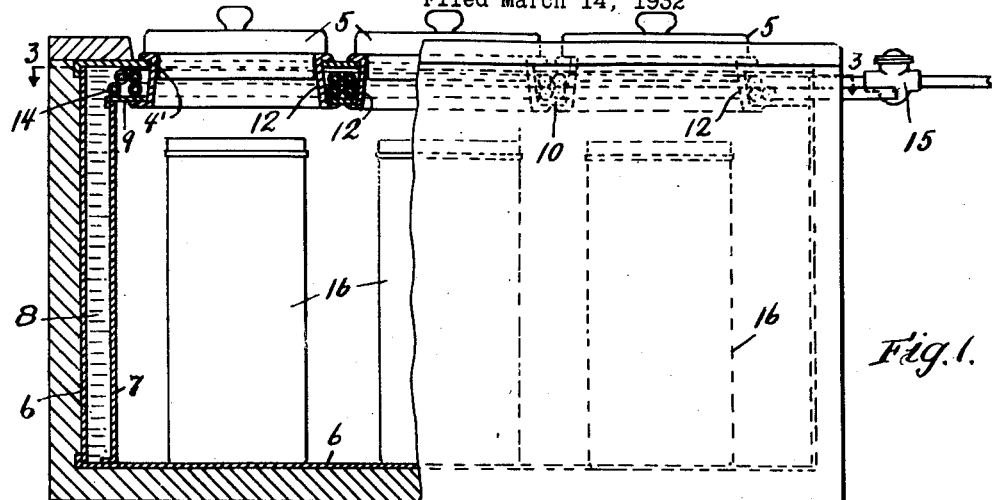
Fig. 1 is a view partly in front elevation, and partly broken away in vertical longitudinal section, of a preferred embodiment of my invention.

As shown in the drawing, I provide an outer casing 4 of the usual rectangular form, which will be constructed of suitable heat insulating material at its bottom, sides and top. The top is provided with several openings 4'; three being shown in the present instance, which are closed by suitable heat insulated covers 5, and said casing 4 is provided with a liquid tight metal lining 6 at its bottom, sides and top.

A storage chamber is provided within said casing which comprises side walls 7, connected at their lower edges, by soldering, or other suitable means, to the bottom portion of the lining 6, and extending vertically at a suitable distance from the side walls of the lining, to provide a brine space 8 therebetween, and a top wall 9, which is spaced at a suitable distance from the top wall of the casing, to provide a top brine space 10, which is in open communication with the side brine space 8 at their intersection.

The top wall 9 is provided with openings corresponding to, and arranged in register with the openings 4' in the top of the outer casing, and a tube or collar 12 is extended between each opening 4 and the corresponding opening in top 9, each tube having a liquid tight connection at its ends with the top lining of the casing and top 9 of the storage chamber, about the openings therein. Said tubes 12 are of trunco-conical form, and are so arranged that the internal diameter thereof increases as they extend downwardly, or inwardly.

Before the top of the casing and its lining are placed in position and connected to the top ends of the tubes 12, a refrigerating expansion coil 14 is arranged in the brine space 10, and, while said coils may be variously arranged so that satisfactory results will be secured, the arrangement shown herein has been found to be particularly advantageous. As shown, the inlet end of the coil is provided with the usual expansion valve 15, from which the pipe forming the coil is extended into the space 10 close to and partly about the tube 12 of the first opening, then partly about the tube 12 of the next or middle opening, then entirely about the tube 12 at the opposite end and about the other tubes in reverse order, and then several coils are extended about all the tubes before it is connected to the return pipe.

The spaces 8 and 10 will be filled with brine, or other liquid having a low freezing point, and, when the refrigerating means with which the coil is connected is operated, heat will be extracted from the top brine space primarily, and, as the brine of lower temperature in the top space will tend to flow downward, and the brine of higher temperature about the sides will tend to rise, the resulting circulation will cause all the brine to be maintained at a nearly uniform low temperature, although the temperature in the top brine space 10 and about the tubes 12 will tend to be somewhat lower than in the side brine space 8. Also, as the number of coils, or turns of pipe 14 at the ends of the cabinet are somewhat greater than at other points, there will be a tendency to reduce the temperature at these points to a greater extent than at other points with the result that the tendency to cause circulation of the brine by differences in temperature will be increased.

The internal diameter of each tube or collar 12 at upper end is slightly greater than the greatest external diameter of the ice cream containers 16, which are to be placed in the storage chamber, to permit the containers to be passed down through the same.

With prior constructions of this character, a single top opening has been provided for each container, and one of the purposes of my invention is to provide an arrangement whereby two containers may be placed in a position in which the contents thereof will be readily accessible through a single opening.

Figure 2:
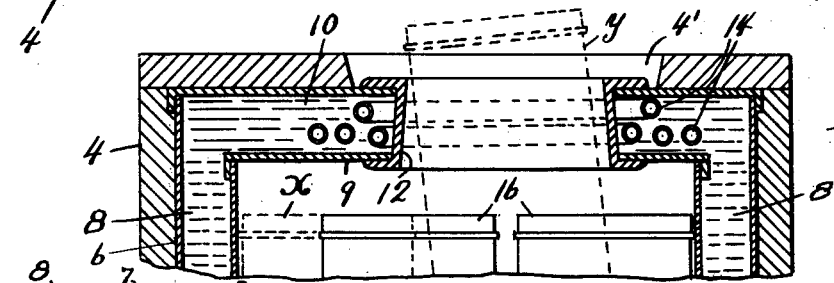
Fig. 2 is a sectional view on an enlarged scale at line 2—2 of Fig. 3.
Figure 3:
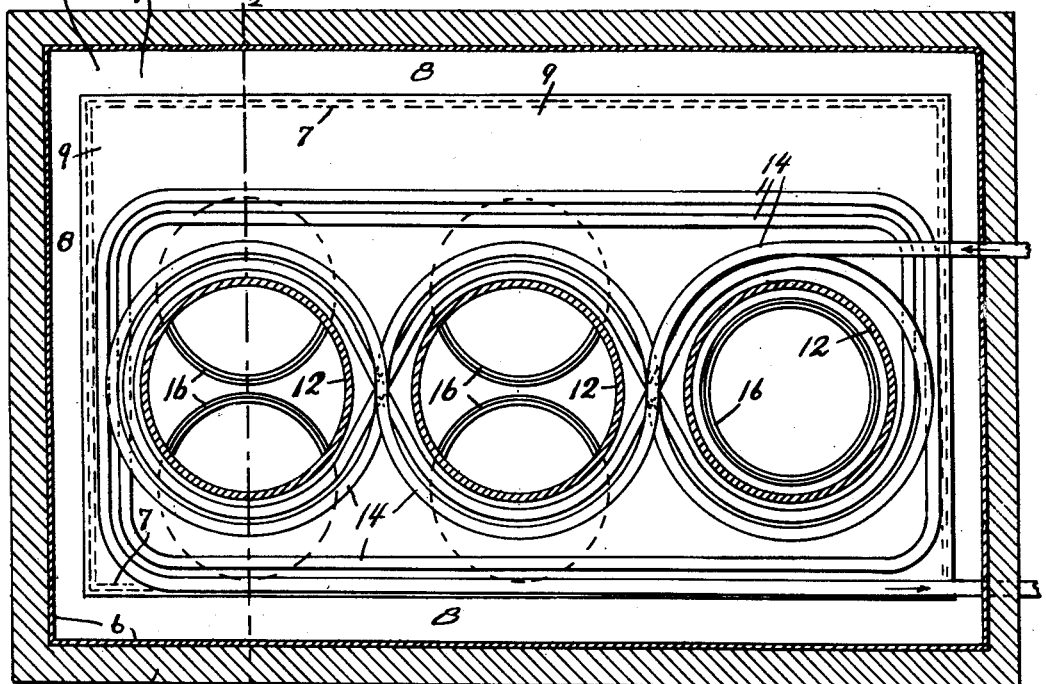
Fig. 3 is a sectional plan view at line 3—3 of Fig. 1.

To accomplish this result, the width of the space between the side walls 7 is increased, and the tubes 12 are connected to the top 9 in a position in which the central line of each tube 12 is at one side of a point midway between the side walls 7, so that one container 16 may be passed down through the tube into the storage chamber and set to one side, as indicated by the dotted line position $x$ of Fig. 2, and then the second container may be passed down through the tube, while held in a slightly inclined position, indicated by dotted line position $y$ in Fig. 2, so that it may be set over against the opposite side, in which position approximately one-half of its top will be directly beneath the lower end of the tube 12, and then the container which was first placed in the chamber may be moved back to a corresponding position, so that the containers will be held in the full line positions of Figs. 2 and 3.

As thus arranged, two containers may be placed in position to be readily accessible through a single top opening and double the number of containers may be stored in the cabinet without increasing its length, or the number of its top openings.

By having the diameter of the tubes 12 increased as they extend inward, the extent to which the width of the storage chamber has to be increased to permit insertion of two containers is reduced, and the space provided for access to the containers is increased.

With the above described construction the temperature of the chamber in which the containers are placed will be at least as low in the upper portion thereof as in the lower portion, so that the temperature about the containers will be nearly uniform and the ice cream in the top portions of the containers will be maintained at a temperature which is at least as low as that in the lower portions thereof.

I claim:

1. A refrigerating cabinet comprising an outer casing having a top opening, a storage chamber within said casing having its sides and top spaced from the sides and top of the outer casing and having a top opening in register with top opening of the casing and a tube connected thereto about its opening and extending to the opening in the casing, to provide a closed brine space extending about the sides and the top of the storage chamber, and a refrigerating coil located in the portion of the brine space above the chamber.

2. A refrigerating cabinet comprising an outer casing having a top opening, a storage chamber within said casing having its sides and top spaced from the sides and top respectively of said outer casing, to provide a continuous brine space therebetween, the top of said chamber having an opening directly beneath said top opening, a tube extending between said openings and having liquid tight connections with said outer casing and the top of said chamber, and a refrigerating expansion coil located between the top of said chamber and the top of the casing and extending about said tube.

3. A refrigerating cabinet comprising an outer casing having a plurality of top openings, a storage chamber within said casing having its sides and tops spaced from the inner surface of the sides and top respectively of said outer casing, to provide a continuous brine space therebetween, and having top openings in register with the corresponding top opening of the outer casing, a tube extending between each of said openings, each tube having a liquid tight connection at its ends with the top of the casing and the top of said chamber, and a refrigerating expansion coil located in the portion of said brine space above said storage chamber and extending about and between said tubes.

PERCY RAY MAIN.